(12) United States Patent
Miyake (10) Patent No.: US 12,090,826 B2
(45) Date of Patent: Sep. 17, 2024

(54) OPENING AND CLOSING MEMBER

(71) Applicant: HONDA MOTOR CO., LTD., Tokyo (JP)

(72) Inventor: Yoshinori Miyake, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 341 days.

(21) Appl. No.: 17/583,216

(22) Filed: Jan. 25, 2022

(65) Prior Publication Data
US 2022/0250453 A1    Aug. 11, 2022

(30) Foreign Application Priority Data

Feb. 7, 2021   (CN) .......................... 202110167528.8

(51) Int. Cl.
*B60J 5/10*    (2006.01)
*B60S 1/04*    (2006.01)
*B60S 1/58*    (2006.01)

(52) U.S. Cl.
CPC ............. *B60J 5/107* (2013.01); *B60S 1/0441* (2013.01); *B60S 1/0411* (2013.01); *B60S 1/583* (2013.01)

(58) Field of Classification Search
CPC ......... B60S 1/583; B60S 1/0441; B60J 5/107; B60J 5/101
USPC ............................................... 296/56, 146.8
See application file for complete search history.

(56) References Cited

U.S. PATENT DOCUMENTS

| | | | | |
|---|---|---|---|---|
| 4,822,098 A | * | 4/1989 | Vogt | B60J 5/107 296/76 |
| 5,621,942 A | * | 4/1997 | Eustache | B60S 1/583 15/250.31 |
| 6,123,384 A | * | 9/2000 | Eustache | B60J 1/1884 15/250.31 |
| 6,174,016 B1 | * | 1/2001 | Ponziani | E05B 85/02 296/146.8 |
| 7,618,083 B2 | * | 11/2009 | Munenaga | B60J 5/101 296/146.8 |
| 2004/0124664 A1 | * | 7/2004 | McClure | B60J 5/107 296/146.8 |

FOREIGN PATENT DOCUMENTS

JP    5846036 B2    1/2016

* cited by examiner

*Primary Examiner* — Jason S Morrow
(74) *Attorney, Agent, or Firm* — CKC & Partners Co., LLC (57) ABSTRACT

An opening and closing member is attachable to a rear opening of a vehicle body in an openable and closable manner. The opening and closing member includes an inner panel disposed to face a vehicle body inner side and a wiper bracket member via which a wiper is attached to an inner side of the inner panel. The inner panel has a bracket attaching part protruding toward the vehicle body inner side. The wiper bracket member has a protruding part protruding toward the vehicle body inner side. The wiper bracket member is attached to the bracket attaching part such that a ridge line of the protruding part is aligned with a ridge line of the bracket attaching part.

6 Claims, 7 Drawing Sheets

OPENING AND CLOSING MEMBER

This application is based on and claims the benefit of priority from Chinese Patent Application No. 202110167528.8, filed on 7 Feb. 2021, the content of which is incorporated herein by reference.

BACKGROUND OF THE INVENTION

Field of the Invention

The present invention relates to an opening and closing member.

Related Art

A known opening and closing member includes a metal housing for supporting a wiper (e.g., see Japanese Patent No. 5846036). The housing is integrally coupled to a lateral reinforcement provided to the opening and closing member, and is utilized as a part of the lateral reinforcement.

Patent Document 1: Japanese Patent No. 5846036

SUMMARY OF THE INVENTION

However, in such a conventional structure where only a lateral reinforcement provides support against a load applied to a housing when a wiper is operated and a load applied when a door is closed, the housing may become unable to withstand such loads, possibly leading to a decrease in its capability over long term use. Therefore, there is a problem in that it is difficult to achieve balance with an occupant protection structure against vehicle collision.

An object of the present invention is to provide an opening and closing member including a wiper supporting member with increased strength and stiffness against a load and accordingly with enhanced durability, making it possible to achieve balance with an occupant protection structure against vehicle collision.

A first aspect of the present invention is directed to an opening and closing member (e.g., a rear gate 1 described later) that is attachable to a rear opening (e.g., a rear opening 101 described later) of a vehicle body (e.g., a vehicle body 100 described later) in an openable and closable manner. The opening and closing member includes an inner panel (e.g., an inner panel 13 described later) disposed to face a vehicle body inner side and a wiper bracket member (e.g., a wiper bracket member 3 described later) via which wiper (e.g., a wiper 2 described later) is attached to an inner side of the inner panel. The inner panel has a bracket attaching part protruding toward the vehicle body inner side. The wiper bracket member has a protruding part (e.g., a protruding part 33 described later) protruding toward the vehicle body inner side. The wiper bracket member is attached to the bracket attaching part to such that a ridge line (e.g., ridge lines R2 described later) of the protruding part is aligned with a ridge line (e.g., described later) of the bracket attaching part.

A second aspect is an embodiment of the first aspect. In the opening and closing member according to the second aspect, the wiper bracket member and the bracket attaching part may each be provided with fixing parts (e.g., first fixing parts 311, second fixing parts 312, described later) disposed on both sides in a vehicle body width direction, and, on both the sides in the vehicle body width direction, the fixing parts of each of the wiper bracket member and the bracket attaching part may be provided at at least two positions spaced apart from each other in the vehicle body width direction.

A third aspect is an embodiment of the first or second aspect. In the opening and closing member according to the third aspect, the wiper bracket member may have a cut-out part (e.g., a cut-out part 34 described later) at its upper end.

A fourth aspect is an embodiment according to the first or second aspect. In the opening and closing member of the fourth aspect, the wiper bracket member may have a rib (e.g., ribs 35 described later) protruding toward the vehicle body inner side.

A fifth aspect is an embodiment of any one of the first to fourth aspects. In the opening and closing member according to the fifth aspect, the wiper bracket member may have a flange part (e.g., a flange part 36 described later) on its peripheral edge.

A sixth aspect is an embodiment of any one of the first to fifth aspects. In the opening and closing member according to the sixth aspect, the wiper bracket member may have a liner material attaching part (e.g., liner material attaching parts 38 described later).

According to the first aspect of the present invention, since the ridge lines of the wiper bracket member and the bracket attaching part of the inner panel coincide with each other, it is possible to disperse a load applied to the wiper bracket member to the entire inner panel via the bracket attaching part. This feature contributes to an increase in the strength and stiffness of the wiper bracket member, making it possible to enhance the durability of the wiper bracket member. Therefore, the wiper bracket member is inhibited from deforming even in the event of vehicle collision, making it possible to achieve balance with an occupant protection structure.

According to the second aspect, the wiper bracket member and the bracket attaching part are each provided with the fixing parts disposed on both the sides in the vehicle body width direction, and are fixed through the fixing parts disposed at two positions spaced apart from each other in the vehicle body width direction, making it possible to increase a suppression power against torsional deformation of the wiper bracket member itself due to a load applied to the wiper bracket member.

According to the third aspect, the cut-out part contributes to a decrease in the weight of the wiper bracket member, making it possible to inhibit the wiper bracket member from falling down due to a load applied to the wiper bracket member.

According to the fourth aspect, the rib makes it possible to further increase the strength and stiffness of the wiper bracket member.

According to the fifth aspect, the flange part makes it possible to further inhibit the wiper bracket member from failing toward the vehicle body inner side.

According to the sixth aspect, it is possible to attach a liner material to the wiper bracket member, making it possible to fully support the liner material with the wiper bracket member having high strength and stiffness.

DETAILED DESCRIPTION OF THE INVENTION

Figure 1:
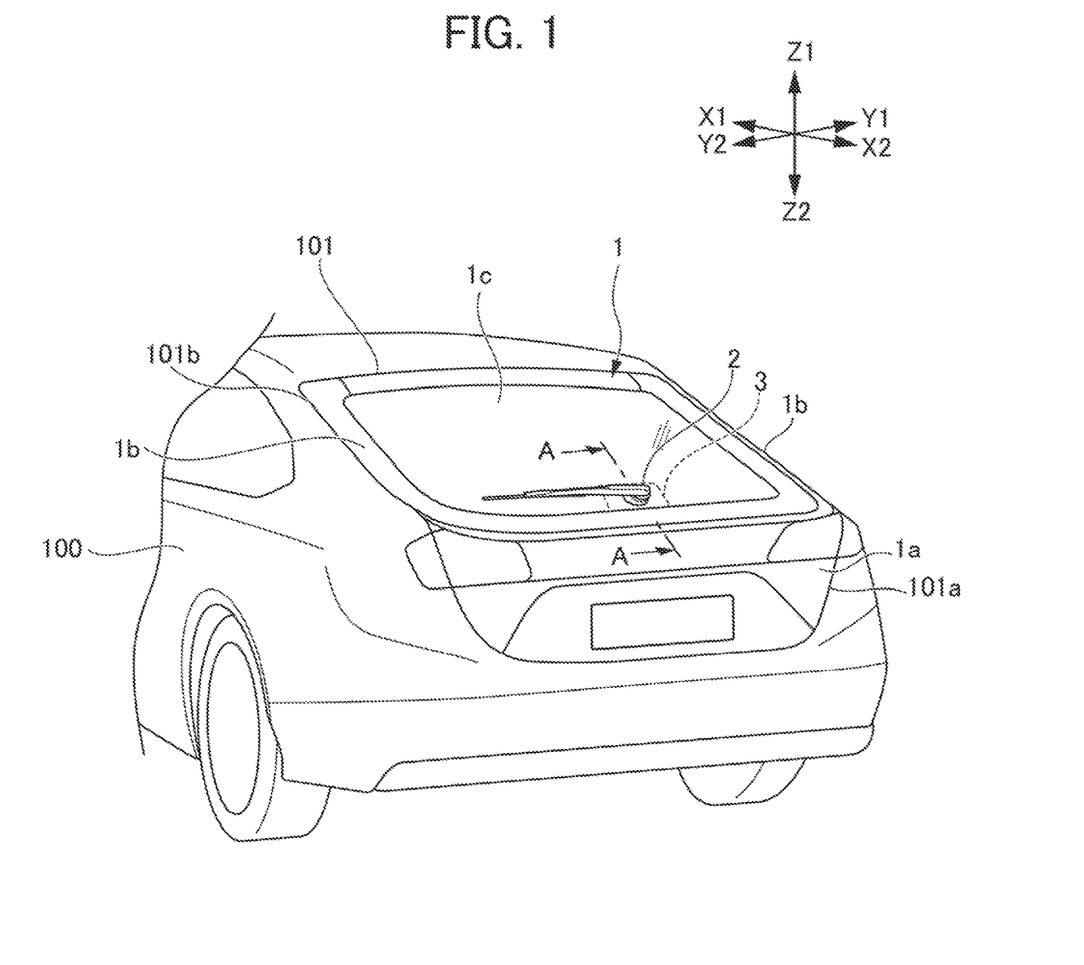
FIG. 1 is a perspective view illustrating a rear of a vehicle, to which an opening and closing member is attached.

An embodiment of the present invention will now be described in detail with reference to the accompanying drawings. As illustrated in FIG. 1, a vehicle body 100 has a rear opening 101 at its rear. A rear gate 1 is attached to the vehicle body 100 such that the rear gate 1 can open and close the rear opening 101.

Note that, as for directions illustrated in the drawings, X1-X2 refers to a vehicle body front-rear direction. The X1 direction refers to the direction toward the front of the vehicle body 100, and the X2 direction refers to the direction toward the rear of the vehicle body 100. Y1-Y2 refers to a vehicle body width direction. When the vehicle body 100 is viewed from the rear, the Y1 direction refers to the direction toward the right of the vehicle body 100, and the Y2 direction refers to the direction toward the left of the vehicle body 100. Z1-Z2 refers to a vehicle body upward-downward direction. The Z1 direction refers to the upward direction with respect to the vehicle body 100, and the Z2 direction refers to the downward direction with respect to the vehicle body 100.

Figure 2:
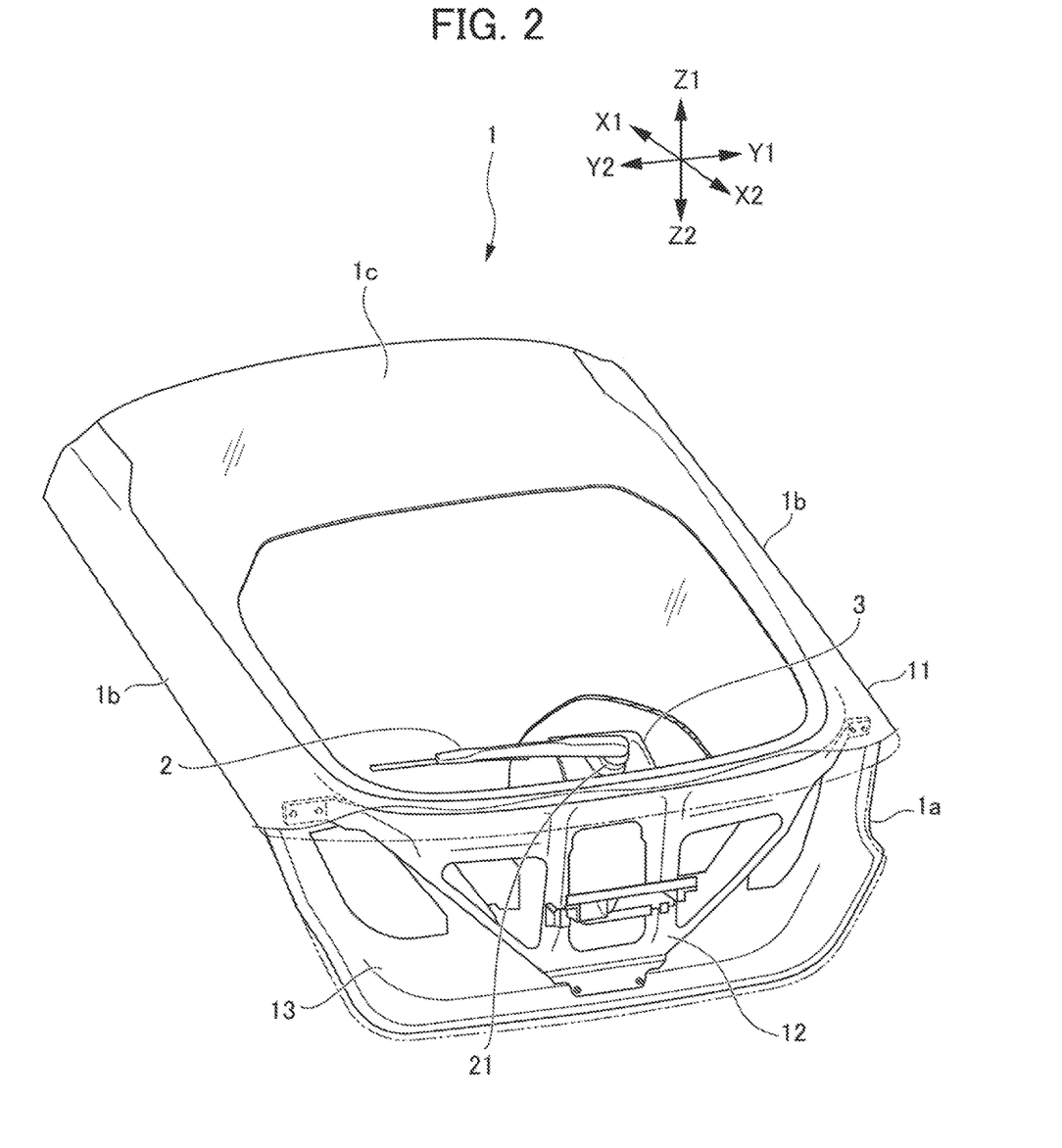
FIG. 2 is a perspective view illustrating, in a partially exploded manner, the opening and closing member.

The rear gate 1 is an opening and closing member that opens and closes the rear opening 101 of the vehicle body 100. As illustrated in FIGS. 1 and 2, the rear gate 1 has: a rear end part 1a that closes a rear end opening 101a that is a portion of the rear opening 101: a pair of side parts 1b, 1b respectively extending from both ends in the vehicle body width direction of the rear end part 1a, toward the front of the vehicle body 100; and a glass panel 1c attached continuously to the rear end part 1a and both the side parts 1b, 1b. Both the side parts 1b, 1b and the glass panel 1c close a top opening 101b that is a portion of the rear opening 101. A wiper 2 is attached to a rear end of the glass panel 1c.

As illustrated in FIG. 2, the rear gate 1 according to the present embodiment includes an outer panel 11, a mid-panel 12, and an inner panel 13. The outer panel 11 is a resin panel that constitutes an outer surface of the rear gate 1. The mid-panel 12 is a metal member that is disposed between the outer panel 11 and the inner panel 13, and that constitutes a skeleton of the rear gate 1 together with the inner panel 13. The inner panel 13 is a resin panel that constitutes an inner surface of the rear gate 1. The outer panel 11 and the mid-panel 12 extend over the rear end part 1a and both the side parts 1b, 1b of the rear gate 1. The rear gate 1 is light in weight because it includes the outer panel 11 and the inner panel 13 that are each made of resin. Note that FIG. 2 illustrates, in an exploded manner, a portion of the outer panel 11 and a portion of the glass panel 1c, the former portion being located in the rear end part 1a of the rear gate 1 and the latter portion having the wiper 2 attached thereto.

Figure 7:
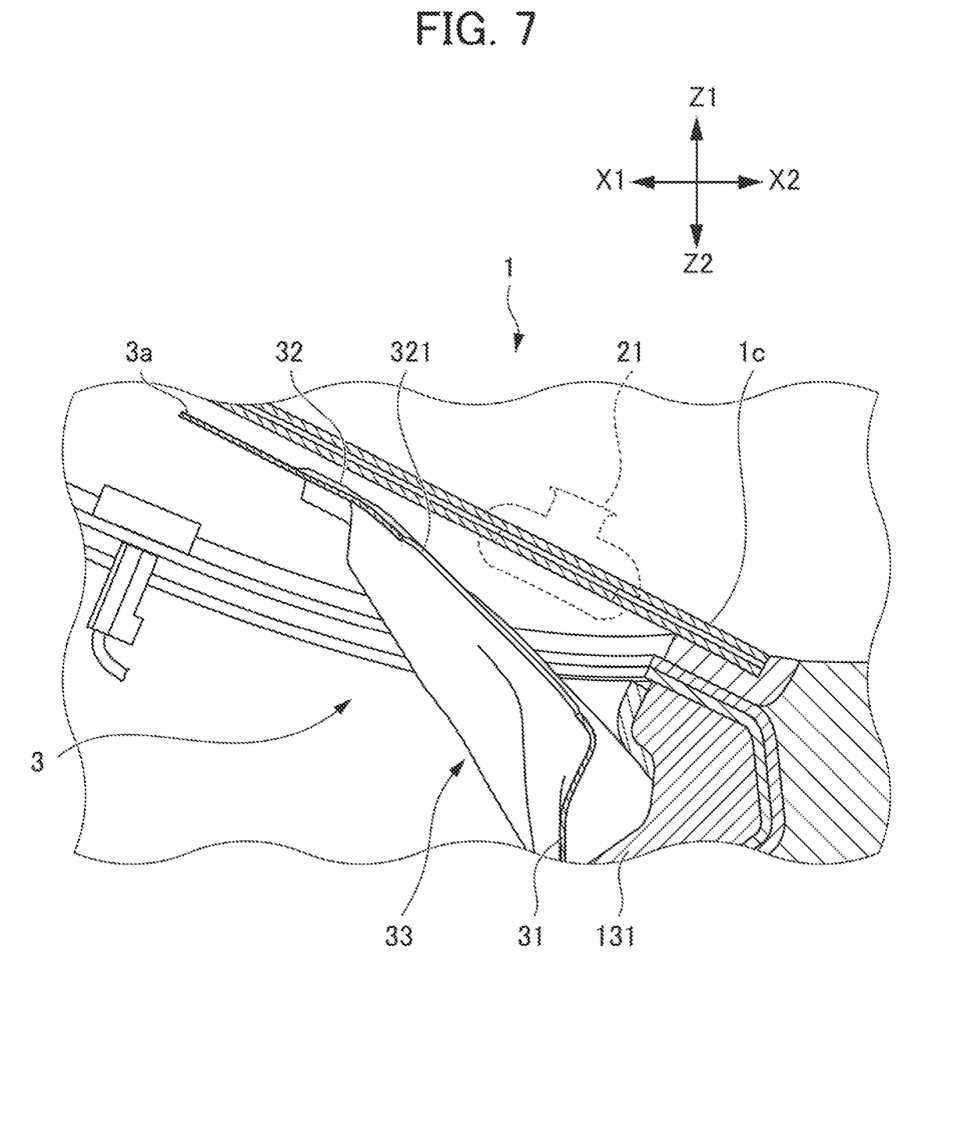
FIG. 7 is a cross-sectional view taken along line A-A in FIG. 1.

As illustrated in FIGS. 1 and 2, the wiper 2 that wipes a surface of the glass panel 1c is attached to the rear end of the glass panel 1c of the rear gate 1. The wiper 2 is attached, via a wiper base part 21, to a wiper bracket member 3 that is made of metal and that is disposed on a side, which is adjacent to a vehicle body inner side, of the rear gate 1. The wiper bracket member 3 is attached to an inner side of the inner panel 13 of the rear gate 1. Note that the "vehicle body inner side" refers to an inner side of the vehicle body 100 relative to the rear gate 1 in a state where the rear gate 1 closes the rear opening 101. The wiper 2 is driven by a wiper driving component (not illustrated) such as a motor. The wiper driving component is attached to the wiper bracket member 3. However, FIGS. 3, 4, and 7 only illustrate with a dotted line the wiper base part 21 disposed adjacent to a shaft of the wiper 2.

Figure 3:
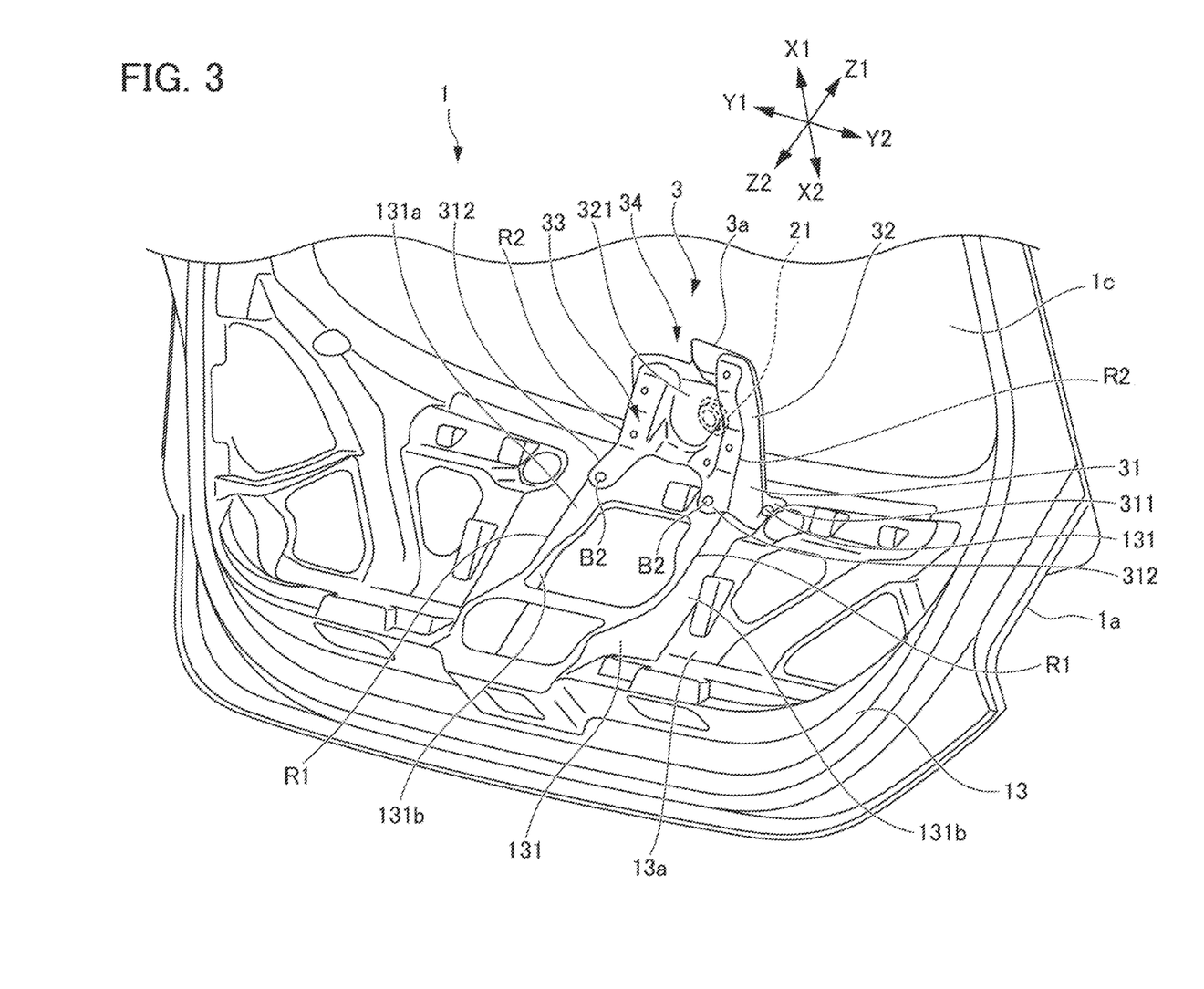
FIG. 3 is a perspective view of a rear of the opening and closing member, when viewed from a vehicle body inner side.
Figure 4:
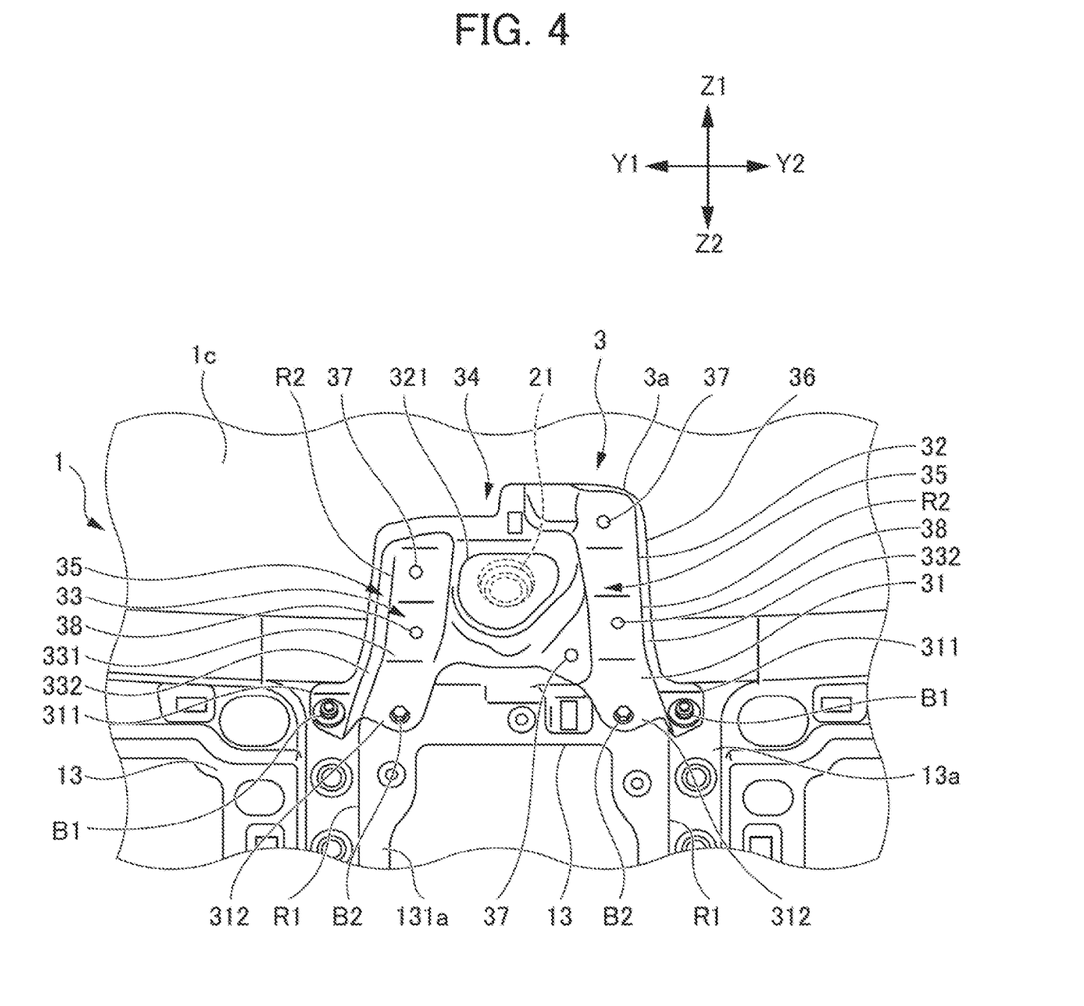
FIG. 4 is a front view of a wiper bracket member attached to an inner panel of the opening and closing member, when viewed from the vehicle body inner side.

As illustrated in FIG. 3, the inner panel 13 of the rear gate 1 has, on an inner surface 13a facing the vehicle body inner side, a bracket attaching part 131 to which the wiper bracket member 3 is attached. The bracket attaching part 131 is a protrusion formed by making a substantially central portion, in the vehicle body width direction, of the inner surface 13a of the inner panel 13 protrude toward the vehicle body inner side. Specifically, the bracket attaching part 131 includes a protrusion end face 131a and side surfaces 131b, 131b. The protrusion end face 131a is positioned at an end in the protruding direction and has a predetermined width in the vehicle body width direction. The side surfaces 131b, 131b couple both ends of the protrusion end face 131a in the vehicle body width direction to the inner surface 13a of the inner panel 13. The bracket attaching part 131 extends in the vehicle body upward-downward direction, over a substantially the entire length of the rear end part 1a of the rear gate 1. Accordingly, as illustrated in FIGS. 3 and 4, the bracket attaching part 131 has a pair of ridge lines R1, R1 extending in the vehicle body upward-downward direction, on both side portions in the vehicle body width direction, where the protrusion end face 131a and the side surfaces 131b, 131b meet each other.

Next, the configuration of the wiper bracket member 3 will be described with reference to FIGS. 3 to 7. The wiper bracket member 3 is disposed on an upper end of the bracket attaching part 131 of the inner panel 13, and is attached proximally to the inner surface of the glass panel 1c. Specifically, the wiper bracket member 3 has a lower end attaching part 31 attached to the upper end of the bracket attaching part 131, a wiper attaching part 32 bending and extending along the inner surface of the glass panel 1c, and a protruding part 33 protruding toward the vehicle body inner side.

Figure 5:
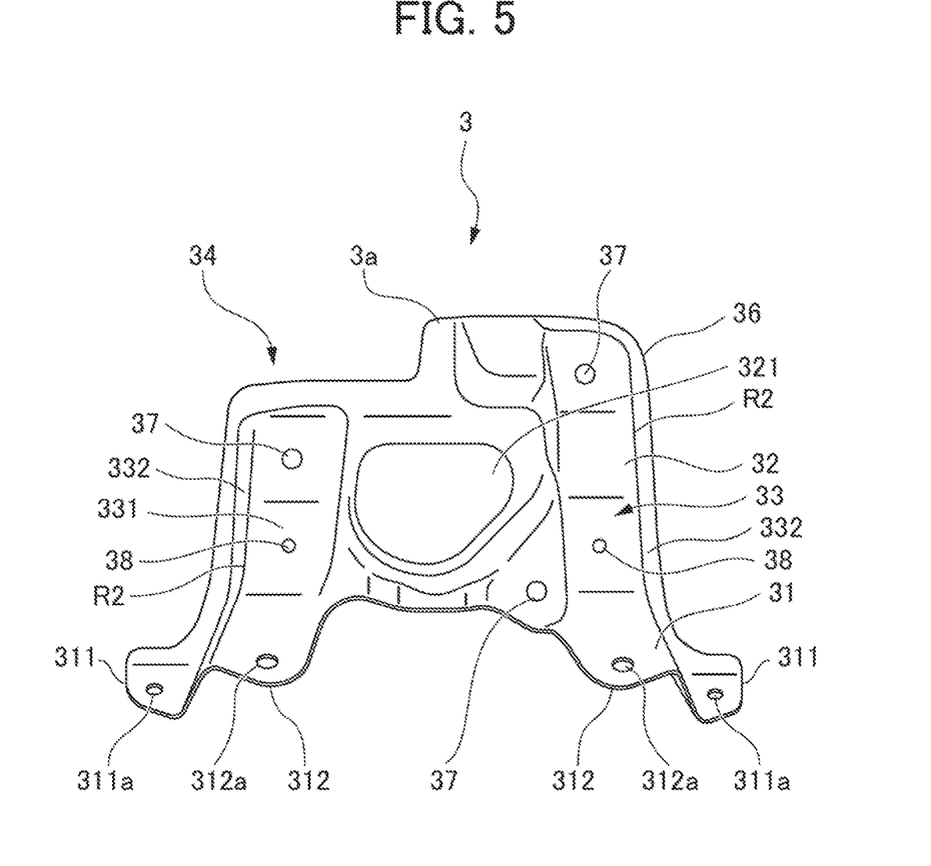
FIG. 5 is a front view of the wiper bracket member, when viewed from a slightly lower side of the vehicle body.
Figure 6:
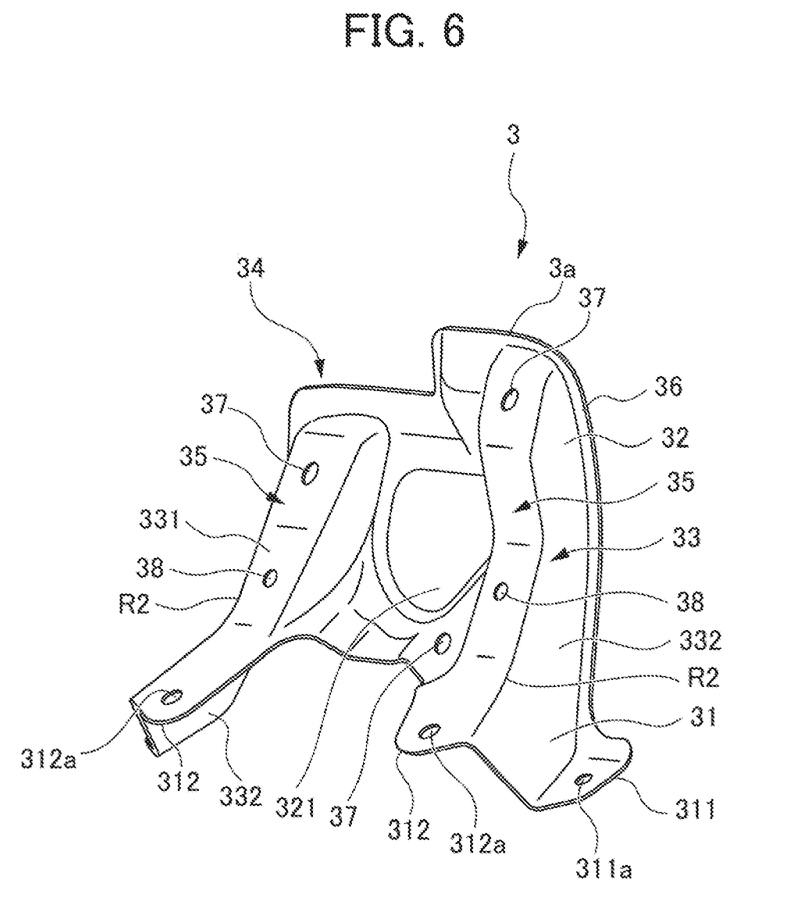
FIG. 6 is a perspective view of the wiper bracket member, when viewed from the slightly lower side of the vehicle body.

The lower end attaching part 31 has, in the vehicle body width direction, a lateral width substantially equal to a lateral width of the upper end of the bracket attaching part 131. The lower end attaching part 31 has a pair of first fixing parts 311, 311 protruding toward both sides in the vehicle body width direction. As illustrated in FIGS. 5 and 6, the first fixing parts 311, 311 are respectively provided with bolt through holes 311a, 311a allowing bolts to pass therethrough to attach the wiper bracket member 3 to the bracket attaching part 131.

The wiper attaching part 32 is integrally continuous with an upper end of the lower end attaching part 31, and extends and bends in vehicle body upward direction and toward the front of the vehicle body so as to lie along the inner surface of the glass panel 1c. The wiper attaching part 32 has an opening 321 at its central portion. The wiper driving component (not illustrated) is attached to the wiper attaching part 32 by means of the opening 321 and wiper attaching holes 37 formed at three positions around the opening 321. With this configuration, a drive shaft (not illustrated) for the wiper 2 passes through the opening 321 and is coupled to the wiper 2 on the outer surface of the glass panel 1c via the wiper base part 21.

The protruding part 33 is formed by way of, for example, press-molding such that the lower end attaching part 31 and the wiper attaching part 32 wholly protrude toward the vehicle body inner side. Thus, the wiper bracket member 3 has a shape generally protruding toward the vehicle body inner side. The protruding part 33 has a protrusion height toward the vehicle body inner side and a protrusion width in the vehicle body width direction that respectively correspond to a protrusion height toward the vehicle body inner side and a protrusion width in the vehicle body width direction of the bracket attaching part 131 of the inner panel 13. Specifically, the protruding part 33 includes a protrusion end face 331 and side surfaces 332, 332. The protrusion end face 331 is positioned at the end in the protruding direction, and extends from the lower end attaching part 31 to the wiper attaching part 32. The side surfaces 332, 332 are provided on both sides, in the vehicle body width direction, of the protrusion end face 331, and bend toward the rear of the vehicle body. Accordingly, as illustrated in FIGS. 3 to 6, the wiper bracket member 3 has a pair of ridge lines R2, R2 on both side portions in the vehicle body width direction, where the protrusion end face 331 and the side surfaces 332, 332 meet each other.

The protrusion end face 331 of the protruding part 33 has, at portions corresponding to the lower end attaching part 31, a pair of second fixing parts 312, 312. Specifically, the second fixing parts 312, 312 are positioned inward toward the vehicle body inner side relative to the first fixing parts 311, 311. Further, the second fixing parts 312, 312 differ in height from the inner surface 13a of the inner panel 13 from the first fixing parts 311, 311. The second fixing parts 312, 312 are respectively provided with bolt through holes 312a, 312a allowing bolts to pass therethrough to attach the wiper bracket member 3 to the bracket attaching part 131.

As illustrated in FIGS. 3 and 4, the wiper bracket member 3 is attached to the bracket attaching part 131 of the inner panel 13. Specifically, the lower end attaching part 31 of the wiper bracket member 3 is attached to the upper end of the bracket attaching part 131 such that the protruding part 33 is externally engaged with the bracket attaching part 131. As a result, on the lower end attaching part 31 of the wiper bracket member 3, the protrusion end face 331 of the protruding part 33 is disposed in contact with the protrusion end face 131a of the bracket attaching part 131 from the vehicle body inner side. On the lower end attaching part 31 of the wiper bracket member 3, the side surfaces 332, 332 of the protruding part 33 are disposed to be externally in contact with the side surfaces 131b, 131b of the bracket attaching part 131 in the vehicle body width direction. As illustrated in FIG. 4, the first fixing parts 311, 311 on both sides of the lower end attaching part 31 of the wiper bracket member 3 are disposed in contact with the inner surface 13a of the inner panel 13 on both sides, in the vehicle body width direction, of the bracket attaching part 131.

The wiper bracket member 3 attached to the bracket attaching part 131 is fixed, at the first fixing parts 311, 311, to the inner surface 13a of the inner panel 13 with bolts B1, B1, and is fixed, at the second fixing parts 312, 312, to the protrusion end face 131a of the bracket attaching part 131 with bolts B2, B2. At this time, the ridge lines R2, R2 of the protruding part 33 of the wiper bracket member 3 are respectively arranged in alignment with the ridge lines R1, R1 of the bracket attaching part 131. That is, the ridge lines R2, R2 of the wiper bracket member 3 are respectively arranged to be continuous with the extending directions of the ridge lines R1, R1 of the bracket attaching part 131.

The rear gate 1 according to the present embodiment, which is configured such that the ridge lines R1 of the wiper bracket member and the ridge lines R2 of the bracket attaching part 131 of the inner panel 13 coincide with each other as described above, makes it possible to effectively disperse a load applied to the wiper bracket member 3 to the entire inner panel 13 via the bracket attaching part 131. This feature contributes to an increase in the strength and stiffness of the wiper bracket member 3, making it possible to enhance the durability of the wiper bracket member 3. Therefore, the wiper bracket member 3 is inhibited from deforming even in the event of vehicle collision, making it possible to achieve balance with an occupant protection structure.

As illustrated in FIG. 4, the wiper bracket member 3 and the bracket attaching part 131 are each provided with the fixing parts disposed on both sides in the vehicle body width direction. On both the sides in the vehicle body width direction, the first fixing parts 311, 311 are provided at two positions spaced apart from each other in the vehicle body width direction, and the second fixing parts 312, 312 are provided at two positions spaced apart from each other in the vehicle body width direction. The wiper bracket member 3 and the bracket attaching part 131 are thus respectively fixed and secured, with the bolts B1, B2, to the inner panel 13. Due to this configuration, the first fixing parts 311, 311 disposed at the two positions and the second fixing parts 312, 312 disposed at the two positions make it possible to prevent the wiper bracket member 3 from generating a torsional force that twists the wiper bracket member 3 itself in the vehicle body width direction due to a load applied to the wiper bracket member 3. This feature makes it possible to increase a suppression power against torsional deformation of the wiper bracket member 3. Disposing the first fixing parts 311, 311 and the second fixing parts 312, 312 at different heights toward the vehicle body inner side as in the present embodiment makes it possible to further effectively increase the suppression power against torsional deformation.

The fixing parts of the wiper bracket member 3 and those of the bracket attaching part 131 are not limited to the first fixing parts 311, 311 and the second fixing parts 312, 312. Each of the wiper bracket member 3 and the bracket attaching part 131 only needs to have such fixing parts disposed, on both sides in the vehicle body width direction, at at least two positions spaced apart from each other in the vehicle body width direction.

As illustrated in FIGS. 5 and 6, the wiper bracket member 3 has a cut-out part 34 at its upper end 3a that is an innermost end protruding toward the vehicle body inner side. The cut-out part 34 contributes to a decrease in the weight of the wiper bracket member 3. This configuration makes it possible to inhibit the wiper bracket member 3 from falling down due to a load applied to the wiper bracket member 3.

As illustrated in FIG. 6, the wiper bracket member 3 has ribs 35, 35 protruding toward the vehicle body inner side. The ribs 35, 35 according to the present embodiment each have a shape dividing the protruding part 33 in the vehicle body width direction, while sandwiching the opening 321 therebetween. The ribs 35, 35 extend from the lower end attaching part 31 to the wiper attaching part 32 of the wiper bracket member 3. The ribs 33, 33, contribute to a further increase in the strength and stiffness of the wiper bracket member 3. This configuration makes it possible to further inhibit the wiper bracket member 3 from falling down due to a load applied to the wiper bracket member 3.

The wiper bracket member 3 includes a flange part 36 on its peripheral edge. The flange part 36 is integral with, and protrude peripherally outwardly from, the wiper bracket member 3. This configuration further reinforces the wiper bracket member 3, and makes it possible to further inhibit the wiper bracket member 3 from falling toward the vehicle body inner side.

As illustrated in FIGS. 5 and 6, the wiper attaching part 32 of the wiper bracket member 3 has a plurality of liner material attaching parts 38 via which a liner material (not illustrated) is attached further inward toward the vehicle body inner side than the inner panel 13 of the rear gate 1. Due to this configuration, the liner material (not illustrated) can be attached to the wiper bracket member 3, making it possible to fully support the liner material (not illustrated) with the wiper bracket member 3 having high strength and stiffness. The liner material attaching parts 38 may also serve as attaching parts for attaching the wiper driving component (not illustrated). Since it is possible to share one part, the number of parts of the rear gate 1 can be reduced. The liner material attaching parts 38 according to the present embodiment are configured as bolt through holes, and disposed at three positions around the opening. However, the positions and the number of the liner material attaching parts 38 are not limited to those of the present embodiment.

What is claimed is:

1. An opening and closing member attachable to a rear opening of a vehicle body in an openable and closable manner, the opening and closing member comprising:
    an inner panel disposed to face a vehicle body inner side; and
    a wiper bracket member via which a wiper is attached to an inner side of the inner panel,
    wherein the inner panel has a bracket attaching part protruding toward the vehicle body inner side,
    the bracket attaching part has a bracket-attaching-part ridge line that extends along an upward-downward direction of the vehicle body,
    the wiper bracket member has a protruding part protruding toward the vehicle body inner side, and
    the wiper bracket member is attached to the bracket attaching part such that a ridge line of the protruding part is continuous and aligned with a direction in which the bracket-attaching-part ridge line extends.

2. The opening and closing member according to claim 1, wherein the wiper bracket member and the bracket attaching part are each provided with fixing parts disposed on both sides in a vehicle body width direction, and
    on both the sides in the vehicle body width direction, the fixing parts of each of the wiper bracket member and the bracket attaching part are provided at at least two positions spaced apart from each other in the vehicle body width direction.

3. The opening and closing member according to claim 1, wherein the wiper bracket member has a cut-out part at an upper end thereof.

4. The opening and closing member according to claim 1, wherein the wiper bracket member has a rib protruding toward the vehicle body inner side.

5. The opening and closing member according to claim 1, wherein the wiper bracket member has a flange part on a peripheral edge thereof.

6. The opening and closing member according to claim 1, wherein the wiper bracket member has a liner material attaching part.

* * * * *